No. 768,459. PATENTED AUG. 23, 1904.
A. R. JEFFREY.
FARM IMPLEMENT.
APPLICATION FILED JAN. 16, 1904.
NO MODEL.

Witnesses:
Inventor,
A. R. Jeffrey,
By Attorneys.

No. 768,459. Patented August 23, 1904.

UNITED STATES PATENT OFFICE.

ANDREW R. JEFFREY, OF WASHINGTON, PENNSYLVANIA.

FARM IMPLEMENT.

SPECIFICATION forming part of Letters Patent No. 768,459, dated August 23, 1904.

Application filed January 16, 1904. Serial No. 189,309. (No model.)

*To all whom it may concern:*

Be it known that I, ANDREW R. JEFFREY, a citizen of the United States of America, residing at Washington, in the county of Washington and State of Pennsylvania, have invented certain new and useful Improvements in Farm Implements, of which the following is a specification, reference being had therein to the accompanying drawings.

This invention relates to certain new and useful improvements in farm implements, and has for its object to provide an implement wherein a scraper, clod-breaker, and harrow are combined in one implement, whereby each one may be used when desired.

Another object of my invention is to provide an implement of this type which when run in one direction will perform the function of a clod-breaker and when run in the opposite direction will serve as a scraper or harrow, means being provided whereby the tongue of the implement may be readily reversed for such usage.

Briefly described, the invention comprises a framework in which is mounted a plurality of wheels, and between said wheels is mounted a plurality of curved blades, which are secured to a hub carried by a central shaft located centrally of the framework, and I provide a plurality of extra blades, which may be readily placed intermediate the other blades to double the working facilities of the implement. A suitable seat is provided upon the framework and means whereby the tongue of the implement may be easily detached and secured to the opposite side of the frame for running the implement in the reverse position.

The invention further consists in the novel construction, combination, and arrangement of parts to be hereinafter more fully described, and specifically pointed out in the claim.

In describing the invention in detail reference is had to the accompanying drawings, forming a part of this application, and wherein like numerals of reference indicate like parts throughout the several views, in which—

Figure 1:
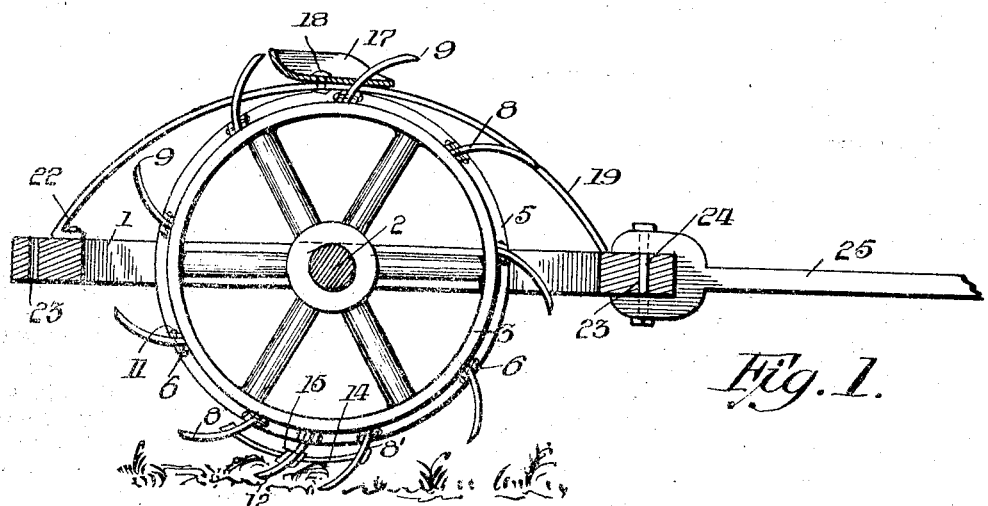
Figure 3:
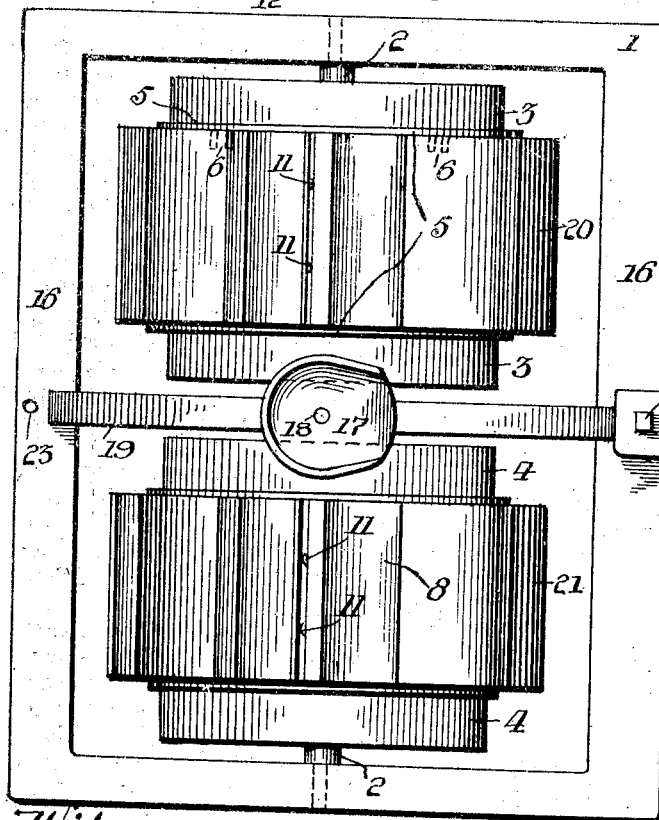
Figure 2:
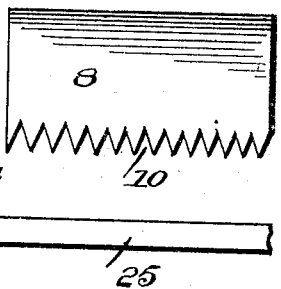

Figure 1 is a longitudinal sectional view of my improved implement. Fig. 2 is a top plan view thereof. Fig. 3 is a modification of one of the blades.

To put my invention into practice, I construct my improved implement with a rectangular frame 1 and secure centrally and longitudinally thereto a central axle or shaft 2, upon which is rotatably mounted the wheels 3 and 4, which are flanged, as indicated at 5, and adjacent to said flanges I provide the peripheral lugs or flanges 6, in which are adapted to be secured the blades 8, which are preferably constructed on a curve, the outer edges of these blades being beveled, as indicated at 9, or, as illustrated in Fig. 3 of the drawings, these blades may be sheared to form teeth 10, and this form of blade is preferably used when it is desired to use the implement as a harrow. These blades are secured upon the wheels 3 and 4 and in the flanges 6 by means of the bolts 11, which pass through said flanges, any number of these bolts being employed to rigidly fasten the blades therein.

In Fig. 1 of the drawings I have illustrated the implement as having secured intermediate the blades 8' an auxiliary blade 12, the lower edge of which is adapted to rest upon the wheels 3 and 4 intermediate the peripheral flanges 6 and is held intermediate the blades 8' by means of a tie-bolt 14, which passes through the blade 12 and is secured to the blades 8', nuts 15 being provided on this bolt to brace the blade 12 thereon. While I have only illustrated one of these blades, it will be readily seen that a plurality of these auxiliary blades may be readily used and placed between the blades 8 of the implement.

Carried by the side frames 16 of the rectangular framework 1 is a seat 17, which is swiveled, by means of a bolt 18, to the metallic band 19, which extends across the top of the implement intermediate the two sets of blades 20 and 21, and this band has its ends secured upon the side frame 16, as indicated at 22. These side frames also have formed therein centrally of their length the apertures 23, in which is adapted to be placed the king-bolt 24, by which the tongue 25 is attached to the frame, and when it is desired to reverse the machine the tongue 25 is detached from the position shown in Fig. 1 of the drawings and placed on the opposite frame to operate the implement rearwardly or in the reverse direction, at the same time the seat being rotated, whereby the same may be occupied by the driver when using the implement in this direction.

It will be noted from the accompanying drawings that the wheels 3 and 4 of the implement will thus protect the blades from sinking into the soil at too great a depth, whereby the team pulling the implement would be stalled, and in constructing the implement the blades may be made of any desired length whereby a sufficient grip will be taken upon the soil without retarding the movement of the implement.

From the position that the implement occupies in Fig. 1 it will be observed that the implement is adapted to be used as a clod-breaker, or when the blades, as illustrated in Fig. 3, are used as a harrow and when the tongue is placed on the reverse side of the machine and the motion thereof reversed a scraper is derived from the same implement. This may be further accomplished by blocking the rotation of the wheels, thus permitting the same to scrape across the soil and accomplish the object desired.

It will be obvious that slight changes may be made in the details of construction without departing from the general spirit of my invention.

Having fully described my invention, what I claim as new, and desire to secure by Letters Patent, is—

An implement of the type set forth comprising a frame supporting wheels spaced apart, blades arranged in said spaces and connected to the wheels, and blades interposed between said first-named blades with means for supporting the second-named blades connected to the first-named blades.

In testimony whereof I affix my signature in the presence of two witnesses.

ANDREW R. JEFFREY.

Witnesses:
K. H. BUTLER,
WM. C. HEITZ.